United States Patent [19]

Gleason

[11] Patent Number: 4,972,940

[45] Date of Patent: Nov. 27, 1990

[54] CONFINED AREA LOADOUT CONVEYOR SYSTEM

[76] Inventor: Newton J. Gleason, 14 Woods Hill Dr., Manchester, Mo. 63011

[21] Appl. No.: 405,310

[22] Filed: Sep. 11, 1989

[51] Int. Cl.$^5$ .............................................. B65G 17/28
[52] U.S. Cl. ...................................... 198/588; 193/22
[58] Field of Search ............... 198/535, 536, 588, 594, 198/587, 589, 668, 608, 861.6; 193/14, 22, 23; 414/397, 398

[56] References Cited

U.S. PATENT DOCUMENTS

| | | | |
|---|---|---|---|
| 760,015 | 5/1904 | Parker | 193/22 |
| 2,800,991 | 7/1957 | Manierre | 198/535 |
| 2,805,760 | 9/1957 | Von Stroh et al. | 198/589 |
| 3,017,012 | 1/1962 | Wilde | 198/589 |
| 3,499,522 | 3/1970 | Novak | 198/536 |

FOREIGN PATENT DOCUMENTS 815173 10/1951 Fed. Rep. of Germany ...... 198/594

*Primary Examiner*—Joseph E. Valenza
*Attorney, Agent, or Firm*—Fleit, Jacobson, Cohn, Price, Holman & Stern

[57] ABSTRACT

A double articulated, triple conveyor system is provided for disposition within a generally rectangular plan shaped loading area and with the conveyor being operative to substantially evenly load fluent material throughout an upwardly opening load receiving receptacle of generally the same plan size and shape and with all components of the conveyor system contained within the boundaries defined by vertical planes containing the boundaries of the aforementioned rectangular plan area.

9 Claims, 2 Drawing Sheets

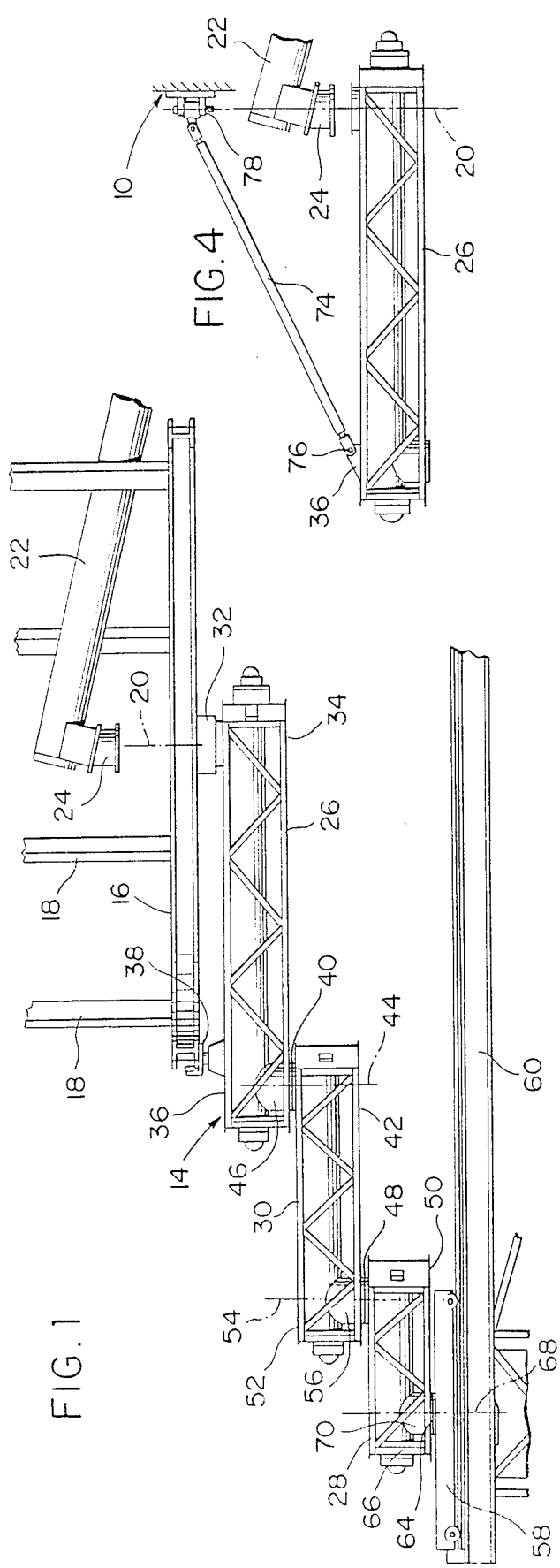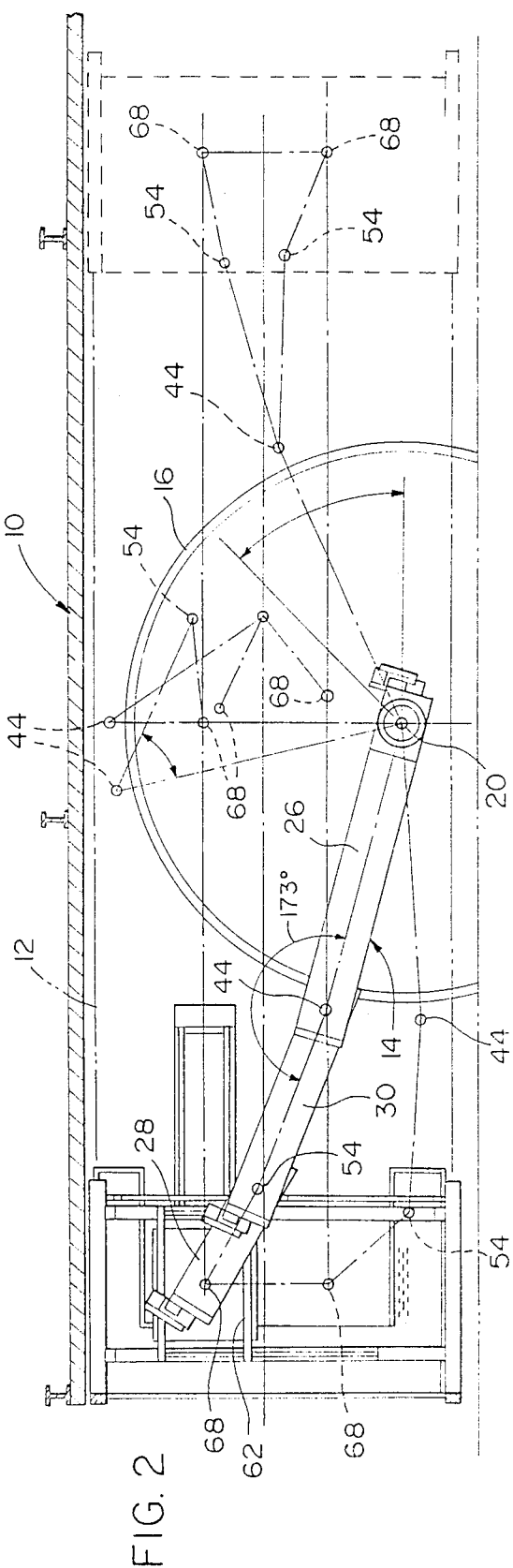

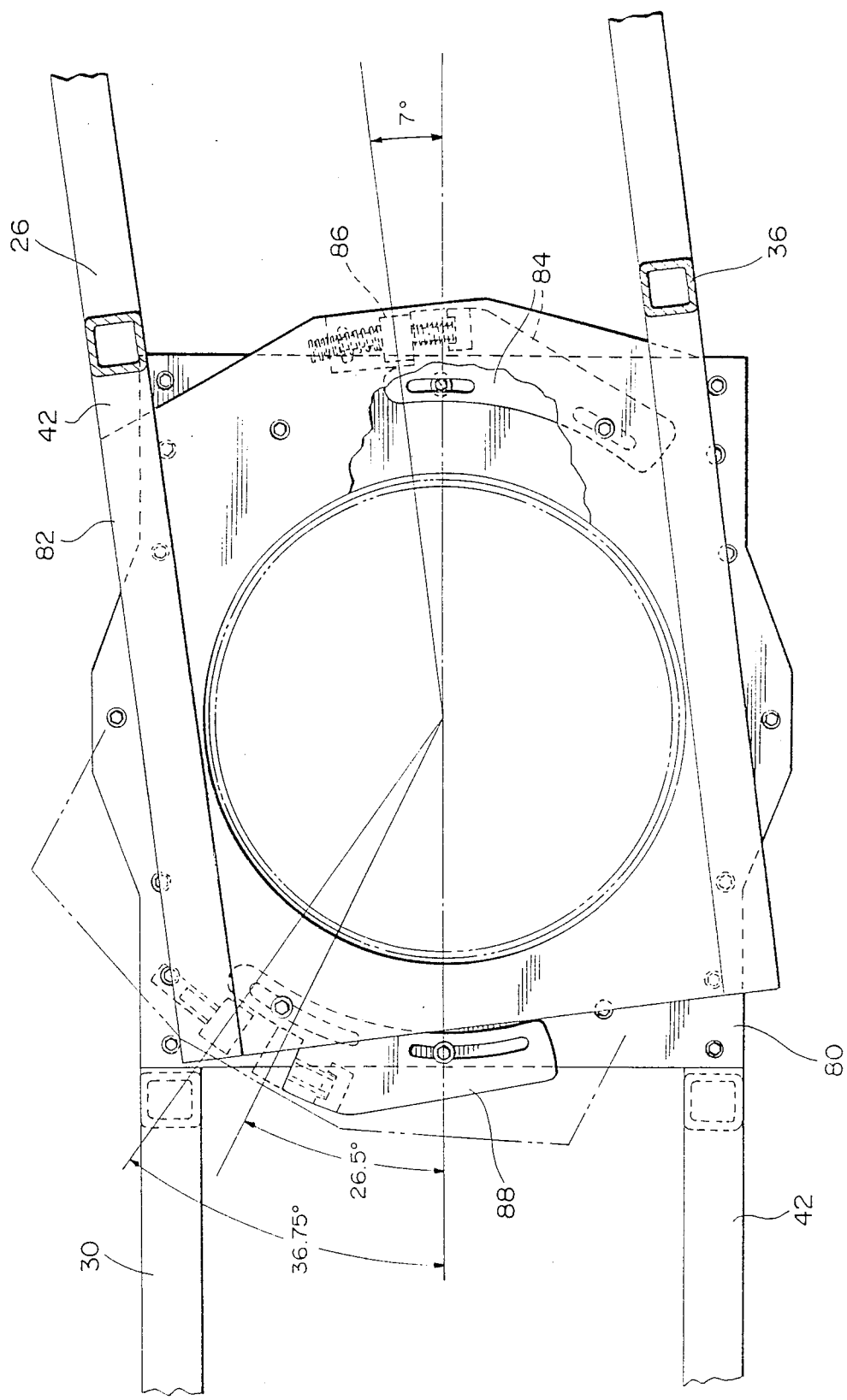

CONFINED AREA LOADOUT CONVEYOR SYSTEM

BACKGROUND OF THE INVENTION

1. Field of the Invention

This invention relates to a confined area loadout conveyor system to be used within the interior confines of a building structure and wherein the conveyor is operative to receive materials to be conveyed from a central location within the aforementioned interior confines and to discharge the conveyed material throughout an area of a shape corresponding to the shape of the aforementioned interior confines, but of smaller dimensions and without any portion of the conveyor system projecting outwardly beyond the aforementioned interior confines.

2. Description of Related Art

Various different forms of conveyor systems including some of general structural and operational features of the instant invention are disclosed in U.S. Pat. Nos. 846,792, 985,436, 1,231,449, 2,344,871, 2,485,462, 2,832,482, 3,435,967, 3,656,607, 4,619,576 and 4,712,962. However, these previously known forms of conveyor systems do not include the overall combination of structural features incorporated in the instant invention which enable the conveyor system of the instant invention to be wholly contained within a confined area, to receive material to be conveyed from a central location within the area and to evenly discharge the conveyed material throughout the area.

SUMMARY OF THE INVENTION

The conveyor system of the instant invention is designed to be fully contained within a building structure (such as a rectangular plan area building) lengthwise through which a hopper-type rail car or the like may be moved for loading purposes. The building structure may be only slightly larger in plan area than the plan area of a typical hopper-type railway car and the conveyor system of the instant invention receives fluent material to be conveyed from a central location within the building structure and is operative to discharge the conveyed fluent material throughout substantially the entire plan area of the building structure without any portion of the conveyor system projecting horizontally outwardly of vertical planes containing the boundaries of the plan area of the building structure.

The main object of this invention is to provide a loadout conveyor for use in loading rail cars and other load receiving receptacles having a generally rectangular plan area (such as open top rectangular truck bodies) and wherein the conveyor assembly may be wholly contained within a rectangular plan area building of only slightly greater length and width dimensions than the rectangular load receptacle into which conveyed granular material is to be evenly loaded.

Another object of this invention is to provide a loadout conveyor in accordance with the preceding objects and which may be constructed mostly of readily available components and operated by a relatively unskilled operator.

Another very important object of this invention is to provide a loadout conveyor whose basic components may be readily dimensionally altered for custom installations and differences in fluent materials to be conveyed thereby.

A final object of this invention to be specifically enumerated herein is to provide a loadout conveyor in accordance with the preceding objects and which will conform to conventional forms of manufacture, be of simple construction and easy to operate so as to provide a device that will be economically feasible, longlasting, and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a side elevational view of a typical loadout conveyor constructed in accordance with the present invention;

FIG. 2 is a plan view of the loadout conveyor illustrating a portion of the building structure with which the conveyor structure is operatively associated in section and indicating, schematically, various different positions of the conveyor system within the building structure;

FIG. 3 is an enlarged fragmentary top plan view illustrating the first pivot connection between the inlet conveyor and the intermediate conveyor and the adjustable stops by which relative angular displacement of the inlet and the intermediate conveyors, in opposite directions, is limited; and FIG. 4 is a fragmentary side elevational view of the first conveyor of the conveyor system illustrating an alternate method of supporting the weight of the discharge end of the first conveyor from the associated building structure.

DESCRIPTION OF THE PREFERRED EMBODIMENT

Referring now more specifically to FIGS. 1 and 2, the reference numeral 10 generally designates a structure such as a building defining a load bed receiving area 12 in which to closely receive an upwardly opening load bed for containing fluent materials and of a plan size and shape corresponding, substantially, to the plan size and shape of the load bed receiving area 12.

For example, hopper-type rail cars and truck trailer bodies as well as other load receiving receptacles of a generally rectangular plan area may be received in the area 12.

The building structure 10 may occupy a plan area only slightly greater than the area 12 to conserve space in a loading area and the conveyor system of the instant invention is referred to in general by the reference numeral 14 and is totally confined within the interior confines of the structure 10.

The conveyor structure 14 includes a horizontal partial circular support track 16 mounted within the structure 10 through the utilization of depending supports 18 or other suitable means and the center of curvature of the track 16 coincides with a first vertical axis 20.

A supply conveyor 22 is provided and includes a downwardly opening outlet 24 centered relative to the axis 20 and the inlet end (not shown) of the supply conveyor 22 is communicated with any suitable source of granular material to be evenly conveyor loaded into an upwardly opening receptacle occupying the area 12.

The conveyor structure 14 comprises a double articulated, triple conveyor system incorporating a first elongated inlet conveyor 26, a second elongated discharge conveyor 28 and a third elongated intermediate conveyor 30.

First support means 32, of any suitable type, pivotally supports the inlet end 34 of the first conveyor 26 from the building structure 10 for angular displacement of the first inlet conveyor 26 about the axis 20 and horizontal swinging of the outlet end 36 of the conveyor 26 about the axis 20, second support means 38 in the form of a carriage guidingly engaged with the support track 16 for movement therealong and carried by the discharge end 36 of the conveyor 26 to thereby support the discharge end of the conveyor 26 from the building structure 10.

First pivot means 40 pivotally mounts the inlet of the intermediate conveyor 30 from the discharge end 36 of the inlet conveyor 26 for angular displacement about a second upstanding axis 44 concentric with the outlet 46 of the conveyor 26 and second pivot means 48 pivotally supports the inlet end 50 of the discharge conveyor 28 from the discharge end 52 of the conveyor 30 for angular displacement relative thereto about a third vertical axis 54 concentric with the outlet 56 of the conveyor 30.

A trolley 58 is provided and rollingly supported from a pair of parallel rails 60 extending longitudinally of the area 12 and supported from the structure 10 in any convenient manner. The trolley 58 includes second support means in the form of a carriage 62 guidingly supported therefrom for guided movement relative thereto transversely of the area 12 and the carriage 62 rotably supports, by the third pivot means 64, the discharge end 66 of the discharge conveyor 28 from the carriage 62 for oscillation relative thereto about a vertical axis 68 concentric with the outlet 70 of the discharge conveyor 28. The outlets 46, 56 and 70, of course, open downwardly through the tubular pivot means 40, 48 and 64, respectively. Also, the first support means 32 is tubular in order that fluent material discharged from the outlet 24 of the supply conveyor 22 may fall into the inlet end 34 of the conveyor 26.

Also, it is to be noted that, while the conveyors, 26, 30 and 28 are illustrated as motorized auger-type conveyors, other types of conveyors could be used such as motorized endless belt conveyors. Further, if vertical height limitations of the structure 10 permit, the conveyors 26, 28 and 30 each could be downwardly inclined toward their discharge ends and such inclined conveyors could comprise tubular or trough-type chutes for gravity flow of fluent materials therethrough, thereby eliminating the need for drive motors for the conveyors 26, 28 and 30.

The support means 58 includes remotely operable reversible motor means (not shown) for reversibly driving the trolley 58 along the rails 60 and for shifting the carriage 62 back and forth transversely of the area 12 relative to the trolley 58.

The four extreme corner positions of adjustment of the outlet 70 for the conveyor 28 are designated by the four extreme corner positions of the axis 68 illustrated at the left and righthand sides of FIG. 2. The phantom lines extending between these four corner positions of the axis 68 as illustrated in FIG. 2 indicate the full boundaries of the area through which the outlet 70 is adjustable relative to the area 12 and, thus, it may be seen that when fluent material is being discharged from the outlet 70 (which may be provided with a downwardly extendible and upwardly retractable spout) the discharged fluent material may be substantially evenly discharged into an upwardly opening receptacle occupying the area 12. Furthermore, as will be hereinafter more fully set forth, each of the pivot means 40 and 48 includes adjustable stop structure whereby the conveyors 30 and 28 may be swung back toward the inlet ends of the conveyors 26 and 30, on only one pair of corresponding sides thereof, to positions angularly displaced approximately 36 and 26 degrees, respectively, from positions vertically aligned with the conveyors 26 and 30. Further, the pivot means 40 and 48 also limit "opening" of the conveyors 28 and 30 relative to the conveyors 30 and 26 to positions generally 7 degrees short of being longitudinally aligned with the conveyors 26 and 30. Thus, the conveyors 30 and 28 may not be swung to positions relative to the conveyors 26 and 30 forming obtuse angles of more than 173 degrees with the upper sides of the conveyors 26 and 30 illustrated in FIG. 2, the relative positions of the conveyors 28 and 30 relative to the conveyors 30 and 26 illustrated in FIG. 2 being the full open positions thereof.

In this manner, there need be no drive connections at the first and second pivot means 40, or at axis 20, and 48 and the only drive structures required are those drive structures (not shown) provided to shift the carriage 62 relative to the trolley 58 and to shift the trolley 58 along the rails 60. This enables the operator of the conveyor structure 14 to operate the latter by using only two reversible controls for controlling the positioning of the outlet 70 of the conveyor 28.

It is believed that it will be obvious from FIG. 2 wherein alternate positions of the axes 44, 54 and 68 are designated by corresponding numerals provided with phantom lead lines.

With attention now invited more specifically to FIG. 4, it may be seen that the discharge end 36 of the conveyor 26 may be supported from the structure 10 through the utilization of an inclined brace 74 anchored to the discharge end 36 as at 76 and pivotally mounted from the structure 10 for angular displacement about the axis 20 by a pivot connection 78. Such construction would be used in lieu of the support track 16 and second support means 38, the brace 74 serving the purpose of the guided second support means 38.

With attention now invited more specifically to FIG. 3, the inlet end 42 of the conveyor 30 includes a lower mounting plate 80 thereon and the discharge end 36 of the conveyor 26 includes an upper mounting plate 82 thereon, the mounting plates 80 and 82 comprising parts of the first pivot means 40. The upper side of the lower mounting plate 80 includes an angularly adjustable open stop structure 84 supported therefrom and the underside of the upper mounting plate 82 includes a spring biased stop assembly 86 supported therefrom engagable with the stop structure 84 to limit relative angulation of the conveyors 26 and 30 to positions generally 7 degrees before 180 degree end aligned positions. Further, the upper side of the lower mounting plate 80 also includes an angularly adjustable closed stop structure 88 with which the stop assembly 86 is abuttingly engagable to limit relative angular displacement of the conveyors 26 and 30 swinging the discharge end 43 of the conveyor 30 toward the inlet end 34 of the conveyor 36 to a position with the conveyors 26 and 30 defining an included angle of generally 36 degrees.

The second pivot means 42 between the conveyors 28 and 30 is similarly constructed, but the closed stop structure 88 and the second pivot means 48 limit swinging of the discharge end 66 of the conveyor 28 back toward the inlet end 42 of the conveyor 30 to a position with the conveyors 28 and 30 defining an included angle of generally 26 degrees.

With the above stated limits of relative pivotal movement between the conveyors 26 and 30 and between the conveyors 28 and 30, the operator of the conveyor structure 46 may move the axis 68 anywhere within the straight lines interconnecting the four locations of the axis 68 illustrated in the right and left hand portions of FIG. 2. The limits of relative oscillation of the conveyors 26, 28 and 30 insure that "binding" of adjacent conveyors will not occur. Actually, an upwardly opening rectangular plan area loadbed may be readily substantially evenly filled through the utilization of the conveyor structure 14 merely by placing the conveyors in operation and causing the pivot axis 68 to successively orbit the rectangular perimeter of the area bounded by the aforementioned four corner locations of the pivot axis 68.

It will also be noted that the open and closed stop structures 84 and 88 and the spring stop 86 may be reversed relative to the plates 80 and 82 if desired. Further, other stops and stops structures may be used.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

WHAT IS CLAIMED AS NEW IS AS FOLLOWS:

1. In combination, a structure defining a confined plan area having horizontal longitudinal X and lateral Y dimensions extending in corresponding X and Y directions, a double articulated, triple conveyor system incorporating a first elongated generally horizontal inlet conveyor having inlet and outlet ends, a second elongated, generally horizontal discharge conveyor having inlet and outlet ends and a third elongated, generally horizontal intermediate conveyor having inlet and outlet ends, first support means supporting said inlet end of said inlet conveyor from said structure for free angular displacement about a first upstanding axis centrally disposed relative to the X dimension of said area and generally horizontal swinging of said outlet end of said inlet conveyor about said upstanding axis, first pivot means mounting said inlet end of said intermediate conveyor relative to said outlet end of said inlet conveyor for receiving material discharged therefrom and for free angular displacement of said inlet end of said intermediate conveyor about a second upstanding axis relative to said outlet end of said inlet conveyor and generally horizontal swinging of said outlet end of said intermediate conveyor about said second upstanding axis, second pivot means mounting said inlet end of said discharge conveyor relative to said outlet end of said intermediate conveyor for receiving material discharged therefrom and for free angular displacement of said inlet end of said discharge conveyor about a third upstanding axis relative to said outlet end of said intermediate conveyor and generally horizontal swinging of said outlet end of said discharge conveyor about said third upstanding axis, second support means pivotally supporting said discharge conveyor, at a point spaced therealong from said third axis toward said discharge end thereof, for relative angular displacement relative to said support means about a fourth upstanding axis, means operative to adjustably shift said second support means horizontally within said confined area in said X and Y directions, said first pivot means including stop means limiting angular approach of said discharge end of said intermediate conveyor in one direction toward the inlet end of said inlet conveyor to a position short of, but closely approaching, a position in 180° end aligned position relative to said inlet conveyor, said second pivot means including stop means limiting angular approach of said discharge end of said discharge conveyor in one direction, corresponding to the first mentioned one direction, toward the inlet end of said intermediate conveyor to a position short of, but closely approaching, a position in 180° end aligned position relative to said intermediate conveyor, said first pivot means also including stop means limiting angular departure of said discharge end of said intermediate conveyor in the opposite direction away from said inlet end of said inlet conveyor to a position closely approaching, but short of, that angular position in which said intermediate and inlet conveyors would be longitudinally aligned, said second pivot means including stop means limiting angular departure of said discharge end of said conveyor in the opposite direction away from the inlet end of said intermediate conveyor to a position closely approaching, but short of, that angular position in which said discharge and intermediate conveyors would be longitudinally aligned.

2. The combination of claim 1 wherein said first axis is substantially stationary relative to said area and is disposed adjacent one of the limits of said Y dimension.

3. The combination of claim 1 including load support means supporting said discharge end of said inlet conveyor from said structure for guided horizontal swinging about said first axis.

4. The combination of claim 3 wherein said load support means includes a horizontal arcuate track supported from said structure and a follower mounted from said discharge end of said inlet conveyor guidingly supported from said track.

5. The combination of claim 3 wherein said load support means includes an elongated support member inclined relative to said inlet conveyor and having one end anchored to the discharge end of said inlet conveyor and the other end thereof pivotally mounted from said structure for angular displacement about said first axis invertically spaced relation relative to said inlet end of said inlet conveyor.

6. The combination of claim 1 wherein said inlet, outlet and intermediate conveyors are substantially horizontally disposed.

7. The combination of claim 2 wherein said second support means is mounted from said structure for generally horizontal movement in said X and Y directions within a second area smaller than and generally centered relative to the first mentioned area.

8. The combination of claim 7 wherein said areas are substantially rectangular in plan shape.

9. The combination of claim 1 wherein said stop means limiting angular approach of said discharge end of said intermediate conveyor in said one direction toward the inlet end of said inlet conveyor limits said angular approach to a position approximately 36° short of a position in 180° end aligned position relative to said inlet conveyor and said stop means limiting angular approach of said discharge end of said discharge conveyor toward the inlet end of said intermediate conveyor limits said approach to a position approximately 26° short of a position with said discharge conveyor in 180° end aligned position relative to said intermediate conveyor, said stop means limiting angular departure of said discharge end of said intermediate conveyor in said opposite direction and said stop means limiting angular departure of said discharge end of said discharge conveyor in said opposite direction limiting angular displacement of said intermediate and discharge conveyors, respectively, to positions generally 7° short of positions of said intermediate and discharge conveyors in end aligned relation with said inlet and intermediate conveyors, respectively.

* * * * *